United States Patent
Ordeman

(10) Patent No.: US 6,543,739 B2
(45) Date of Patent: Apr. 8, 2003

(54) MOUNTING SYSTEM

(75) Inventor: John Ordeman, Girrawheen (AU)

(73) Assignee: Sentinel Safety Systems PTY Ltd., Western Australia (AU)

(*) Notice: Subject to any disclaimer, the term of this patent is extended or adjusted under 35 U.S.C. 154(b) by 0 days.

(21) Appl. No.: 10/169,275

(22) PCT Filed: Dec. 29, 2000

(86) PCT No.: PCT/AU00/01607
§ 371 (c)(1),
(2), (4) Date: Jun. 28, 2002

(87) PCT Pub. No.: WO01/49155
PCT Pub. Date: Jul. 12, 2001

(65) Prior Publication Data
US 2003/0001060 A1 Jan. 2, 2003

(30) Foreign Application Priority Data
Dec. 31, 1999 (AU) .............................. PQ 4934

(51) Int. Cl.[7] .............................................. A47B 91/00
(52) U.S. Cl. ................................................. 248/346.04
(58) Field of Search ...................... 248/346.01, 346.03, 248/346.04, 689, 551, 553; 126/24, 390.1

(56) References Cited

U.S. PATENT DOCUMENTS

| | | | | |
|---|---|---|---|---|
| 4,838,239 A | * | 6/1989 | Ordeman | 126/39 R |
| 5,638,806 A | | 6/1997 | Foust | 126/24 |
| 6,029,940 A | * | 2/2000 | Klein | 248/346.04 |

FOREIGN PATENT DOCUMENTS

| | | | |
|---|---|---|---|
| FR | 2642150 | 1/1989 | F24C/15/10 |
| GB | 1276726 | 7/1972 | A47J/36/34 |
| GB | 2153204 | 8/1985 | A47J/36/34 |
| GB | 2285383 | 12/1995 | |
| WO | WO 85/04792 | 7/1985 | A47J/36/34 |

* cited by examiner

Primary Examiner—Ramon O Ramirez
(74) Attorney, Agent, or Firm—Duane Morris LLP

(57) ABSTRACT

A mounting system for detachably mounting an item (10) to a base. The mounting system includes a first engaging portion on the item (10) and a second engaging portion on the base. The first engaging portion includes a first flange portion (24) adapted to engage with a second flange portion (50) on the second engaging portion. The item includes a locking member (28) which is moveable between a first position in which it engages with the second flange portion (50) and prevents detachment of the item (10) from the base and a second position in which the locking member (28) does not engage with the second flange portion (50) and the item (10) is removable from the base.

9 Claims, 6 Drawing Sheets

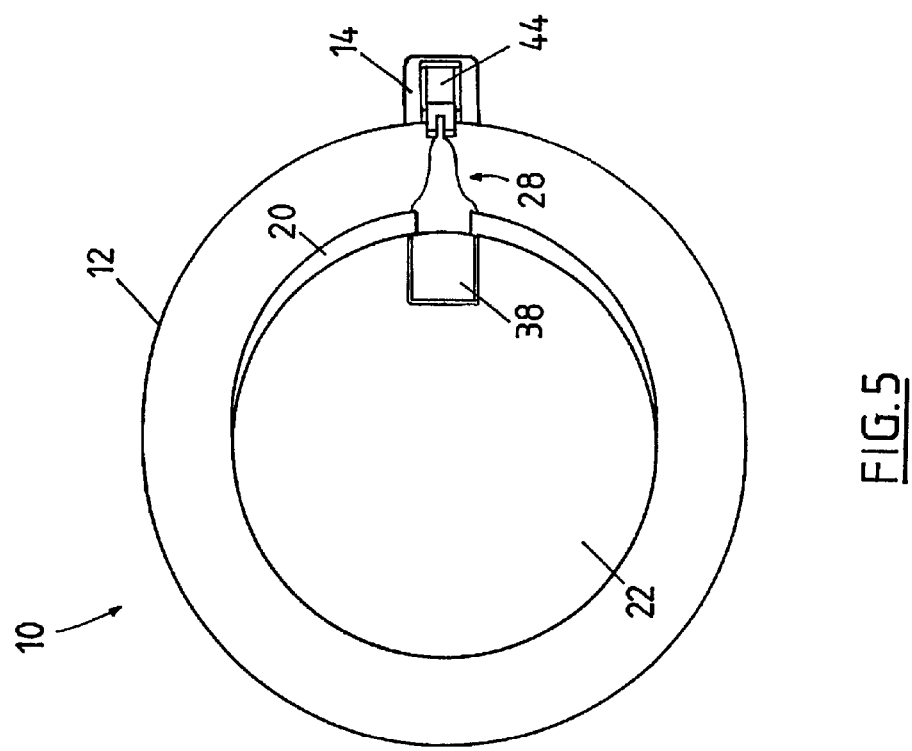
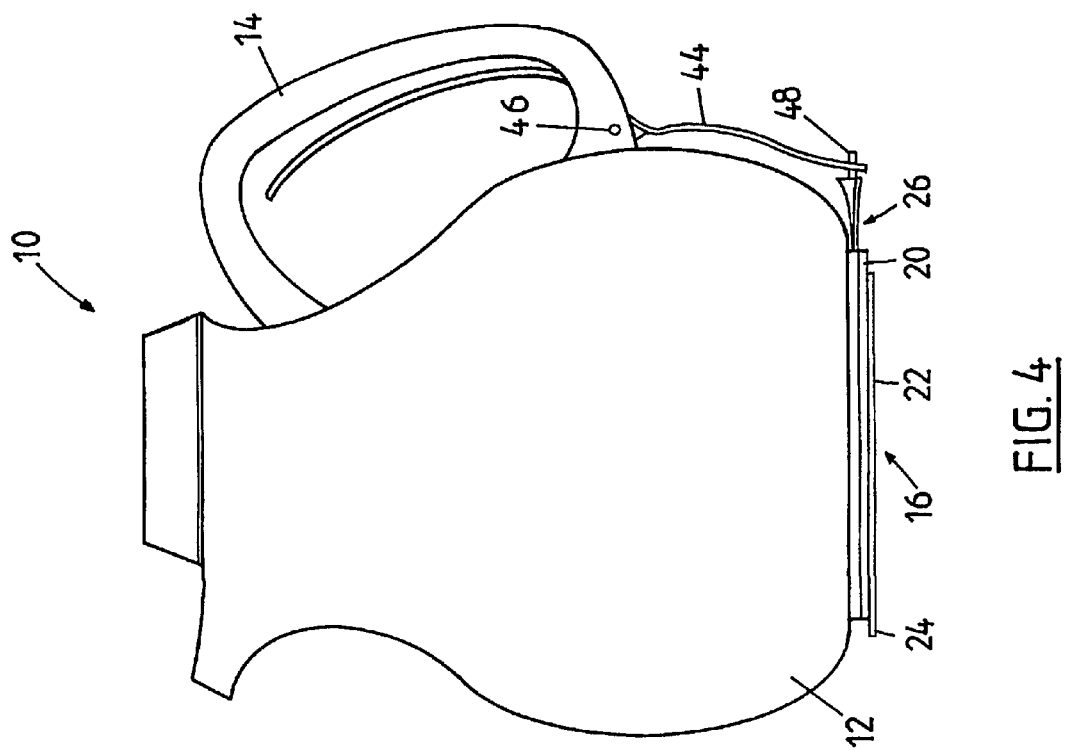

MOUNTING SYSTEM

BRIEF DESCRIPTION OF THE INVENTION

The present invention relates to a mounting system for detachably mounting an item to a base member.

FIELD OF THE INVENTION

It is known to provide a mounting system for detachably mounting an item to a base member which includes a male element located on the item and a female element located on the base member. The female element is adapted to receive the male element. The male element includes a disc-like portion having a first flange extending radially outwardly to one side of the disc. The female element includes an aperture defining a circumferential second flange. The system operates such that when the male element is received in the female element, the first flange engages with the second flange and disengagement of the item from the base member when the item is subjected to a sudden impact force is restricted. The system also operates such that disengagement of the item from a base when manipulated by a user is permitted. Generally, the base member forms part of a work surface, a table or a heating portion of a stove and generally the item is a saucepan, jug or other household implement which is used to contain food or drink.

While this system operates satisfactorily in restricting detachment of the item from the base when the item is subjected to a sudden impact force, it is possible that the item may become unintentionally detached from the base in some situations, for example when the item is subjected to random forces such as are typical in an aircraft or on a boat.

The present invention seeks, therefore, among other things, to provide a mounting system which alleviates the above mentioned disadvantage.

SUMMARY OF THE INVENTION

In accordance with an aspect of the present invention, there is provided a mounting system for detachably mounting an item to a base member, said system including a first engaging portion accommodated on said item, a second engaging portion accommodated on said base member and adapted to engage with the first engaging portion, and releasable locking means, the first engaging portion having a first flange portion, the second engaging portion having a second flange portion adapted to engage with the first flange portion when the first engaging portion is engaged with the second engaging portion, and the locking means including a locking member movable between a first position, at which when the first engaging portion is engaged with the second engaging portion the locking member engages with the second flange portion and thereby prevents detachment of said item from said base member, and a second position at which when the first engaging portion is engaged with the second engaging portion the locking member does not engage with the second flange portion and thereby allows detachment of said item from and attachment of said item to said base member.

DESCRIPTION OF THE DRAWINGS

The present invention will now be described, by way of example only, with reference to the accompanying drawings in which:

FIG. 4 is a diagrammatic side view of the item shown in FIGS. 1 to 3 with the locking means of the mounting system shown in a second position;

FIG. 5 is a diagrammatic lower plan view of the item as shown in FIG. 4;

DESCRIPTION OF THE INVENTION

Referring to FIGS. 1 to 5 of the drawings, there is shown an item 10 which may be a jug, a saucepan or any other household implement which is adapted to hold food or drink. The item 10 includes a body portion 12, a handle portion 14 engageable by a user, and a first engaging portion, in this example in the form of a male member 16.

The male member 16 forms part of a mounting system in accordance with the present invention.

Figure 6:
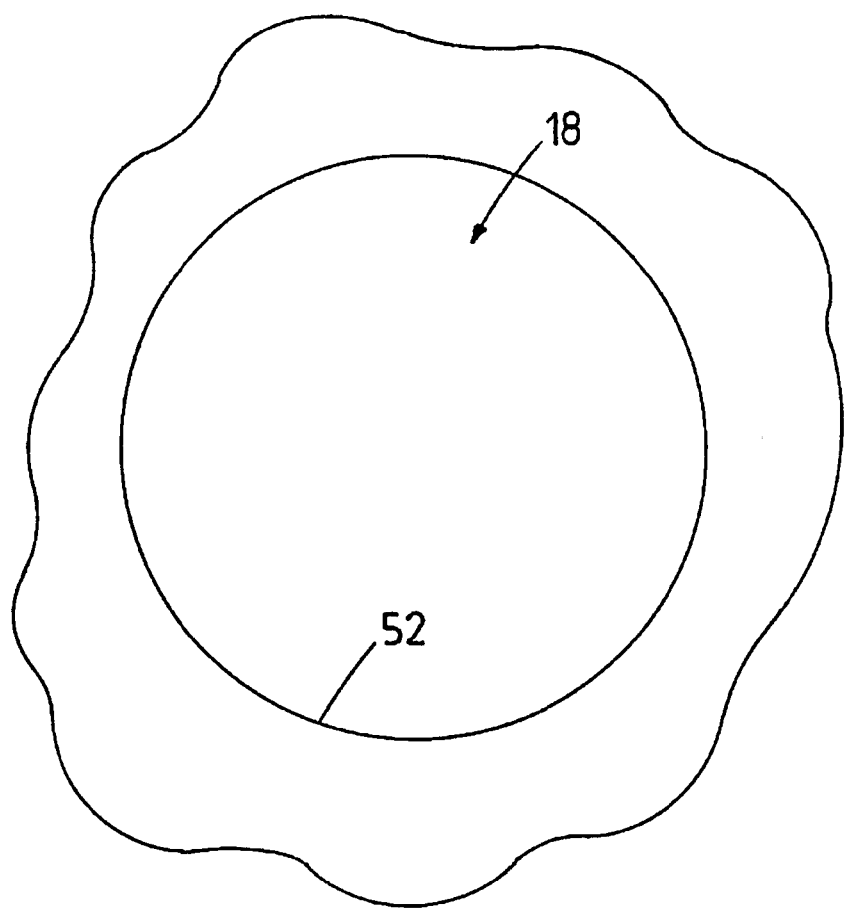
FIG. 6 is a diagrammatic plan view of a second engaging portion of the mounting system in accordance with the present invention.
Figure 7:
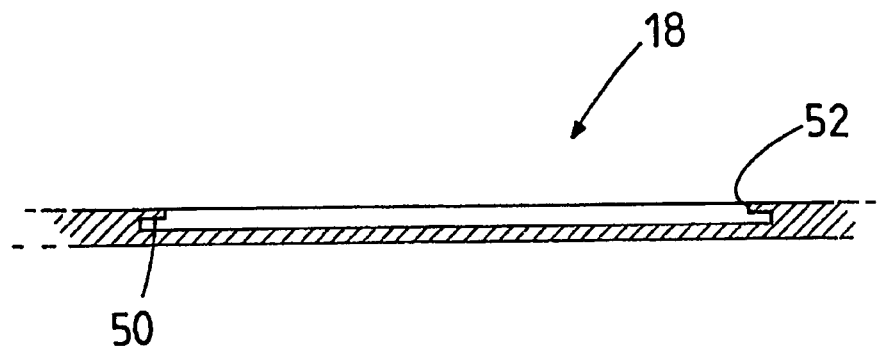
FIG. 7 is a diagrammatic cross-sectional view of the second engaging portion shown in FIG. 6.

The mounting system also includes a second engaging portion, in this example in the form of a female member 18 as shown more particularly in FIGS. 6 and 7. The second engaging portion is formed in a base member, which may be a work surface, a table, a heating portion of a stove or part of any other article relative to which the item 10 is desired to be retained.

The male member 16 includes a first disc portion fixedly attached to a lower portion of the body portion 12, and a second disc portion 22 eccentrically fixed relative to the first disc portion 20 so as to define a first flange portion 24 which extends outwardly of the first disc portion 20. It will be understood that the second disc portion 22 may alternatively be integrally formed with the first disc portion 20.

Figure 2:
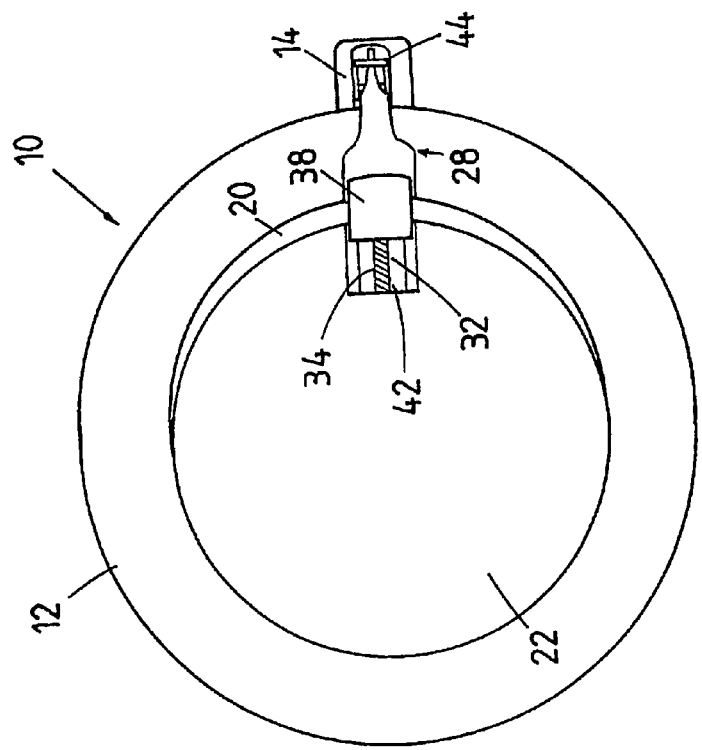
FIG. 2 is a diagrammatic lower plan view of the item as shown in FIG. 1.
Figure 1:
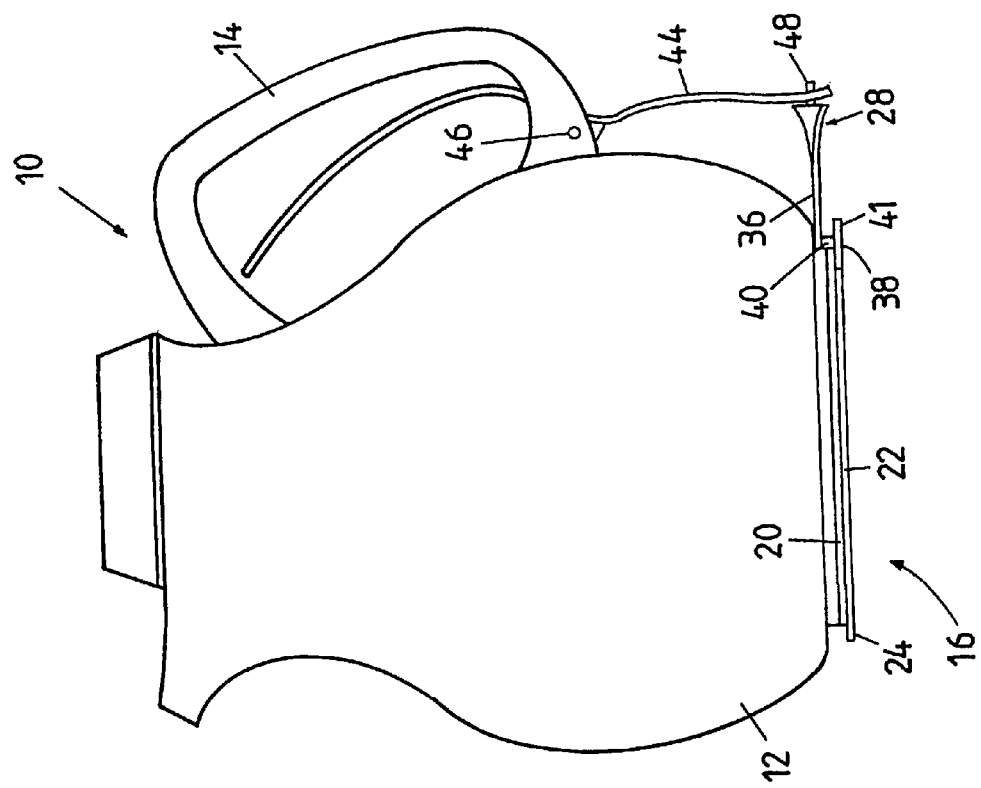
FIG. 1 is a diagrammatic side view of an item incorporating a first engaging portion of a mounting system in accordance with the present invention with locking means of the mounting system shown in a first position.

The male member 16 also includes locking means, in this example in the form of a locking member 28 of generally I-shape transverse cross-section. The locking member 28 is movable relative to the male member 16 in a direction substantially parallel to the plane of the second disc portion 22 between a first position wherein the locking member 28 locates relatively outwardly of the first and second disc portions 20, 22 as shown in FIGS. 1 and 2 and a second position wherein the locking member 28 locates relatively inwardly of the first and second disc portions 20, 22 as shown in FIGS. 4 and 5.

The locking means includes biasing means in the form of a spring 32 accommodated on a pin 34. The biasing means biases the locking member 28 towards the first position.

Figure 3:
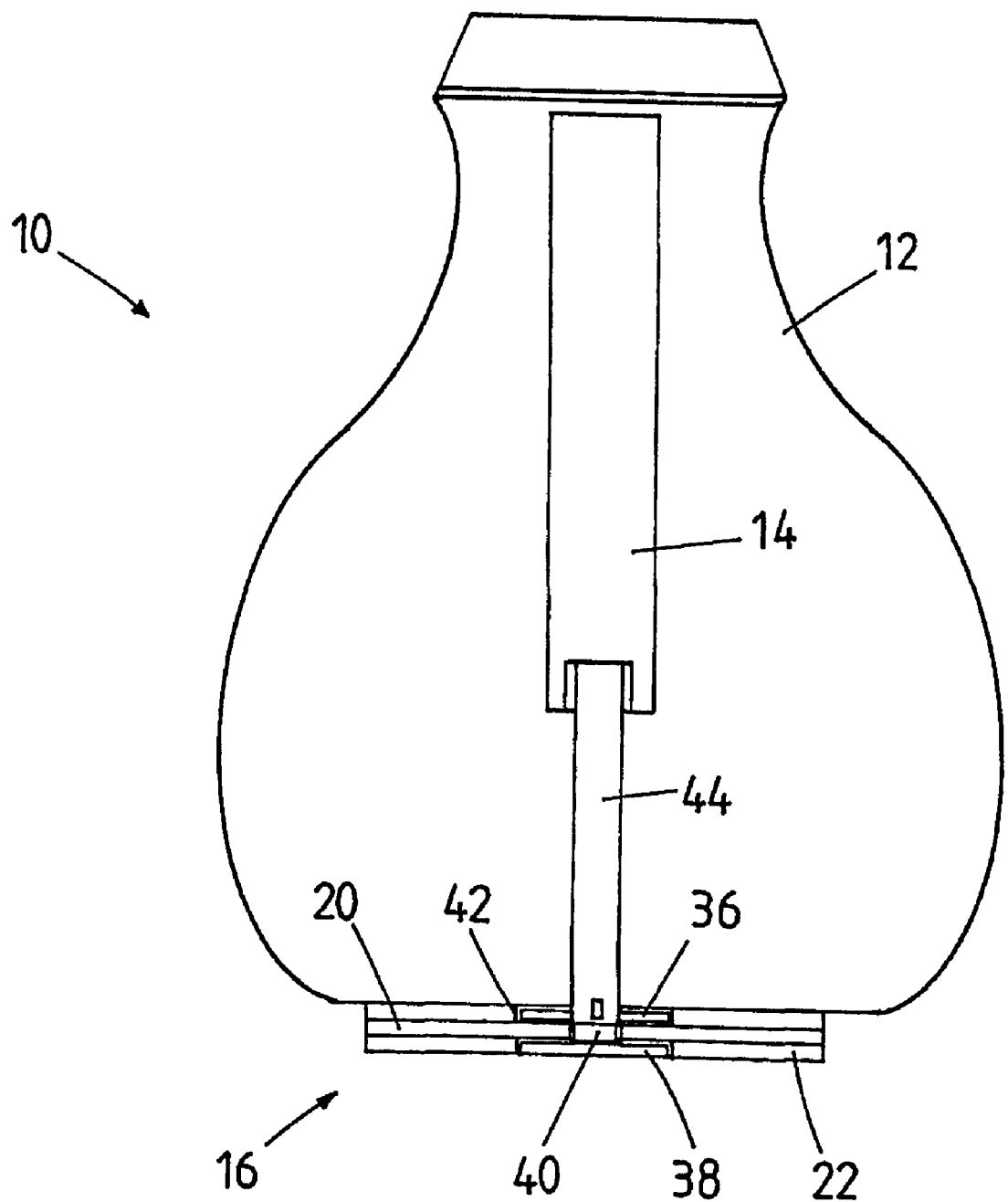
FIG. 3 is a diagrammatic rear view of the item as shown in FIGS. 1 and 2.

The locking member 28 includes a top plate 36, a bottom plate 38 and an interconnecting portion 40. The bottom plate 38 and the interconnecting portion 40 define a lip portion 41. The locking member 28 is received in and is movable relative to a recess 42 formed in the male member 16 as best shown in FIG. 3.

The locking member 28 is movable between the first and second positions by actuating means, in this example in the form of an actuating member 44 pivotably connected at a pivot connection 46 to the handle portion 14 of the item 10. An end of the actuating member 44 remote from the handle portion 14 is flexibly connected to an end of the locking member 28 at a flexible connection 48. The arrangement is such that when a user grips the handle portion 14 and urges an upper portion of the actuating member 44 to pivot towards the user, the locking member 28 is urged to move inwardly of the male member 16 from the first position shown in FIGS. 1 and 2 to the second position shown in FIGS. 4 and 5.

As best seen in FIGS. 6 and 7, the female member 18 includes a second flange portion 50 defining an aperture 52.

Figure 9A:
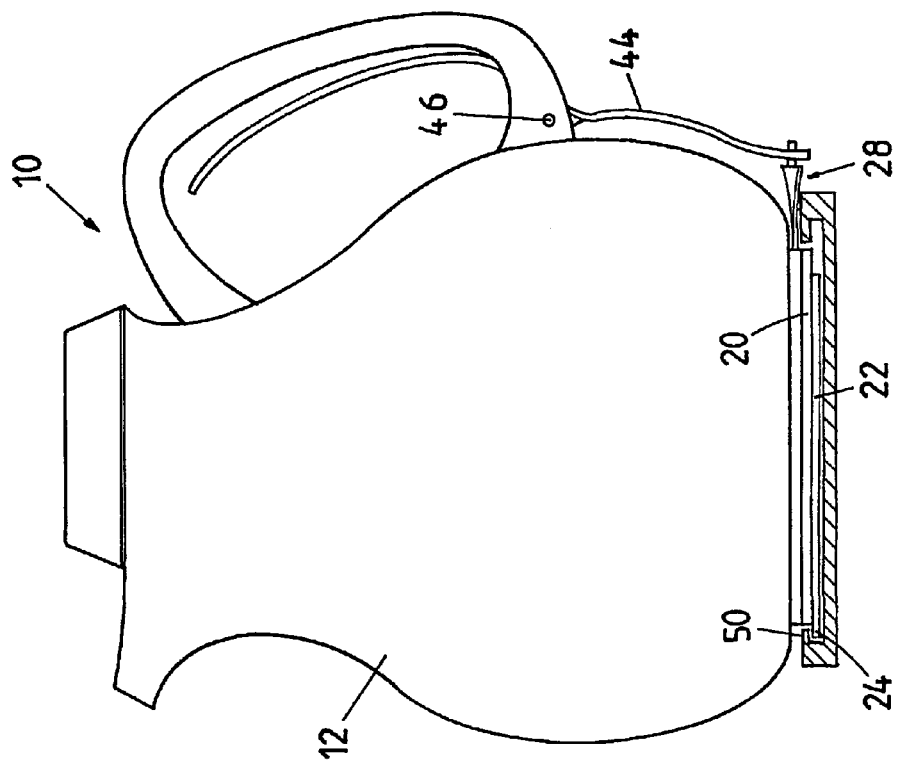
FIGS. 9a and 9b are diagrammatic side views of the item shown in FIGS. 1 to 5 with the first engaging portion shown engaged with the second engaging portion and with the locking means shown in the first position and the second position respectively.
Figure 9B:
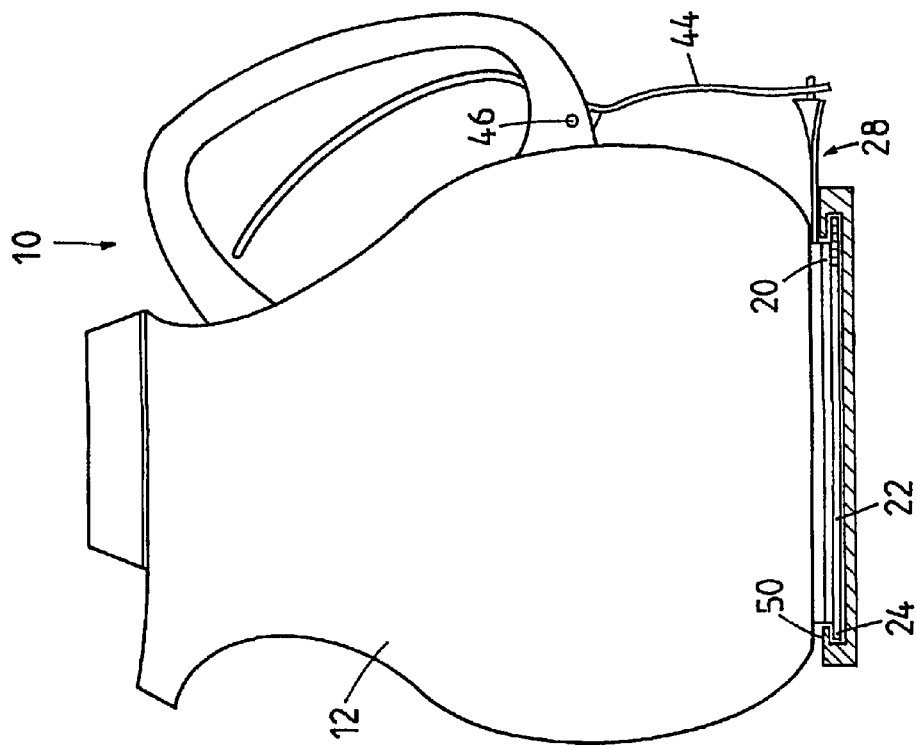

The configuration of the aperture 52 and the second flange portion 50 is such that the male member 16 is receivable in the female member 18 and such that the first flange portion 24 fits snugly under and engages with the second flange portion 50 when the male member 16 is received in the female member 18 as shown in FIGS. 9a and 9b.

The configuration of the female member 18 is also such that when the locking member 28 is in the first position and the male member 16 is engaged with the female member 18, the lip portion 41 fits snugly under and engages with the second flange portion 50 so as to thereby prevent unwanted removal of the item 10 from the base member as shown in FIG. 9a, and when the locking member 28 is in the second position and the male,member 16 is engaged with the female member 18, the lip portion 41 does not engage with the second flange portion 50 as shown in FIG. 9b and removal of the item 10 from the base member is possible.

In use, when it is desired to engage the item 10 with the base member, a user grips the handle portion 14 and urges an upper portion of the actuating member 44 to pivot about the pivot connection 46 towards the user. As a result, the locking member 28 is caused to move from the first position as shown in FIGS. 1 and 2 to the second position as shown in FIGS. 4 and 5. With the locking member 28 in the second position, the male member 16 may be engaged with the female member 18 by introducing the first flange portion 24 into the second flange portion 50 and manipulating the item 10 so that the second disc portion 22 sits on and is generally parallel with the base portion as shown in FIG. 9b. To restrict removal of the item 10 from the base member, the user releases pressure from the upper portion of the actuating member 44 thereby causing the locking member 28 to move from the second position to the first position shown in FIG. 9a by virtue of the biasing means. It will be understood that when the male member 16 is received in the female member 18 and the locking member 28 is in the first position, the item 10 is retained relative to the base member.

When it is desired to remove the item 10 from the base member, the user grips the handle portion 14 and urges the upper portion of the actuating member 44 towards the user thereby causing the locking member 28 to move from the first position to the second position.

It will be understood that with the male member 16 received in the female member 18 and the locking member 28 in the second position, the item 10 is removable from the base member by manipulating the item 10 in an appropriate manner.

Figure 8A:
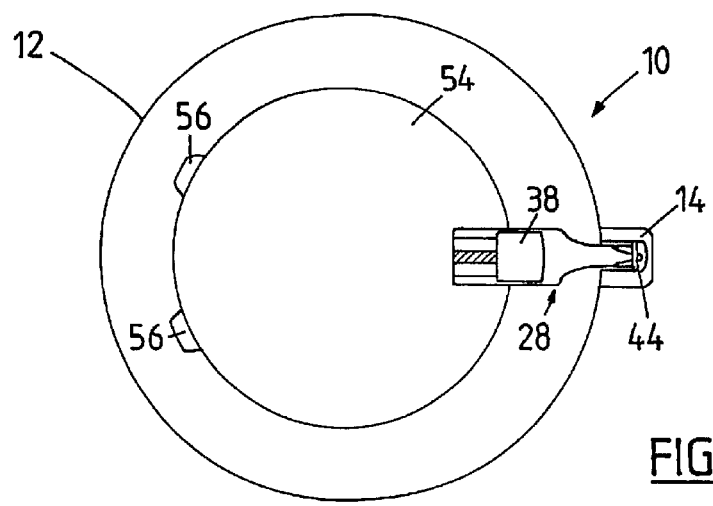
FIGS. 8a, 8b and 8c are diagrammatic lower plan views of alternative arrangements of the first engaging portion in accordance with alternative embodiments of a mounting system in accordance with the present invention.
Figure 8B:
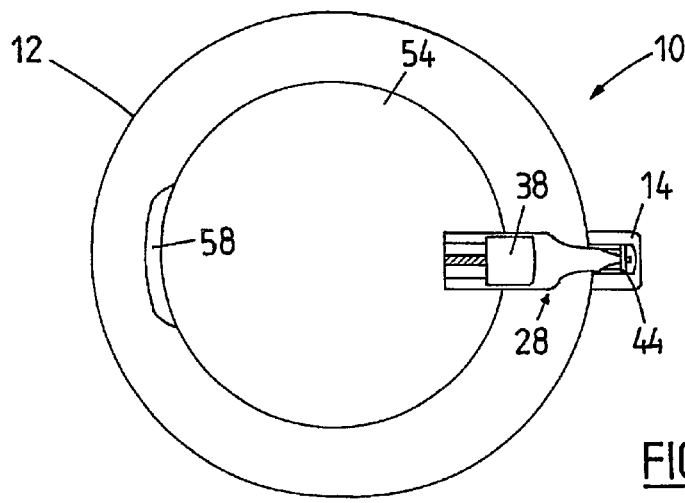
Figure 8C:
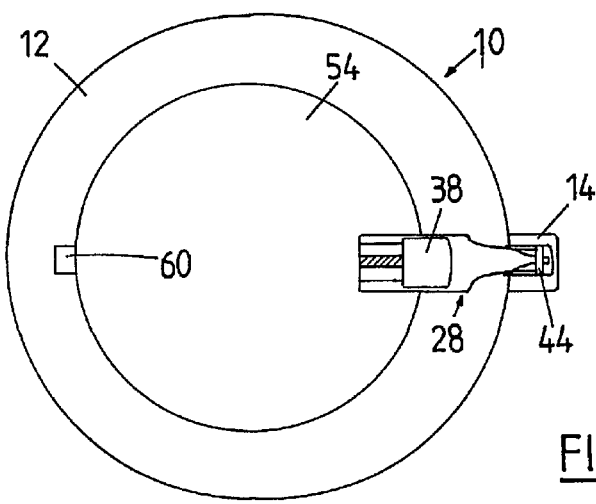

In FIGS. 8a, 8b and 8c there are shown alternative arrangements for the male member 16. Like features are indicated with like reference numerals.

In FIG. 8a, in place of the second disc portion 22 are provided two flange portions 56. In FIG. 8b, in place of the second disc portion 22 is provided a single flange portion 58 of elongate configuration. In FIG. 8c, in place of the second disc portion 22 is provided a substantially rectangular flange portion 60. However, it will be appreciated that each of the alternative male members operates in the same way as the male member shown in FIGS. 1 to 5 in that removal of the item is restrained by engagement of a fixed first flange portion and an adjustable locking member 28 with a second flange portion provided in the base member.

It will also be appreciated that the configuration of the male and female members is preferably such that when the male member is received in the female member, the item 10 is rotatable relative to the base member about an axis substantially perpendicular to the base member.

Furthermore, it will also be appreciated that although the above embodiments have been described in relation to a mounting system wherein a male member is provided on an item and a female member is provided on a base member, the invention is also applicable to a mounting system wherein a female member is provided on an item and a male member is provided on a base member. Of course, however, with such an alternative arrangement, the locking member would be movably mounted relative to the female member, biased inwardly of the female member and caused to move outwardly of the female member on actuation by a user.

Modifications and variations as would be apparent to a skilled addressee are deemed to be within the scope of the present invention.

What is claimed is:

1. A mounting system for detachably mounting an item to a base member, characterised in that the mounting system includes a first engaging portion accommodated on said item, a second engaging portion accommodated on said base member and adapted to engage with the first engaging portion, and releasable locking means, the first engaging portion having a first flange portion, the second engaging portion having a second flange portion adapted to engage with the first flange portion when the first engaging portion is engaged with the second engaging portion, and the locking means including a locking member movable between a first position at which when the first engaging portion is engaged with the second engaging portion the locking member engages with the second flange portion and thereby prevents detachment of said item from said base member, and a second position, at which when the first engaging portion is engaged with the second engaging portion the locking member does not engage with the second flange portion and thereby allows detachment of said item from and attachment of said item to said base member.

2. A mounting system in accordance with claim 1, characterised in that the first flange member extends outwardly from a portion of the first engaging portion adjacent a first side thereof, the locking member is arranged adjacent a second opposed side of the first engaging portion and the second flange portion extends around the second engaging portion adjacent the first and second sides of the first engaging portion when the first engaging portion is engaged with the second engaging portion.

3. A mounting system in accordance with claim 1, characterized in that the first engaging portion is a male member and second engaging portion is a female member, the male member being receivable within the female member when the locking member is in the second position thereof.

4. A mounting system in accordance with claim 3, characterised in that the male member comprises a first disc portion attached to the item and a second disc portion attached eccentrically relative to the first disc portion so as to define the first flange portion.

5. A mounting system in accordance with claim 4, characterised in that the locking member is fully contained within a recess in the second disc member when the locking member is in the second position thereof and a portion of the locking member extends outwardly of the second disc portion when the locking member is in the first position thereof.

6. A mounting system in accordance with claim 3, characterized in that the female member comprises an aperture in the base member, the second flange member extending inwardly of the aperture.

7. A mounting system in accordance with claim 1, characterized in that the locking member includes a biasing means arranged such that the biasing means urges the locking member towards the first position thereof.

8. A mounting system in accordance with claim 1, characterized in that the item is provided with an actuating member pivotally secured to the item, the actuating member being connected to the locking member such that pivoting the actuating member moves the locking member between the first position and the second position.

9. A mounting system in accordance with claim 8, characterised in that a first end of the actuating member is located adjacent a handle on the item so that when the handle is gripped, the actuating member is depressed causing the locking member to move to the second position.

* * * * *